United States Patent [19]

Loiler

[11] 4,232,389
[45] Nov. 4, 1980

[54] RECEIVER FOR SATELLITE NAVIGATIONAL POSITIONING SYSTEM

[75] Inventor: Roger D. Loiler, Newbury Park, Calif.

[73] Assignee: JMR Instruments, Inc., Chatsworth, Calif.

[21] Appl. No.: 28,266

[22] Filed: Apr. 9, 1979

[51] Int. Cl.³ .............................................. H04B 7/00
[52] U.S. Cl. ...................................................... 455/12
[58] Field of Search ................. 178/67, 69.1; 325/329, 325/330, 419; 329/50, 122, 123; 455/12

[56] References Cited

U.S. PATENT DOCUMENTS

| 3,191,176 | 6/1965 | Guier | 178/67 |
| 4,048,563 | 9/1977 | Osborne | 178/69.1 |

*Primary Examiner*—Harold I. Pitts
*Attorney, Agent, or Firm*—Robert Louis Finkel

[57] ABSTRACT

A receiver which responds to United States Navy Satellite Navigational Positioning System (NNSS) transmissions for precise geodetic location of a position on the earth's surface is provided. The receiver of the invention is constructed to use the radio frequency carrier of the phase modulated signals transmitted by the Transit satellites in the NNSS system to recover accurate time interval data.

8 Claims, 6 Drawing Figures

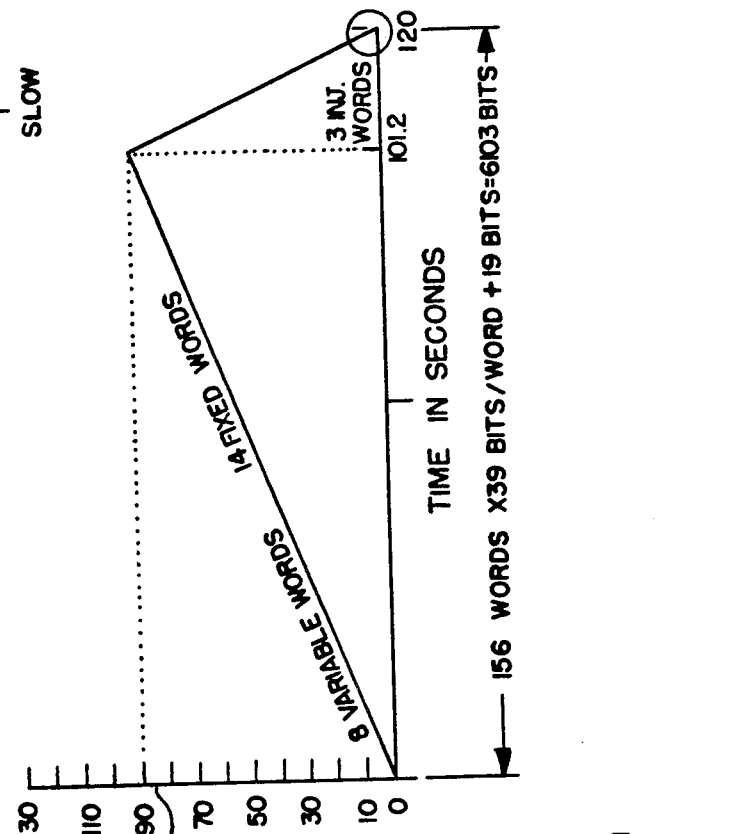

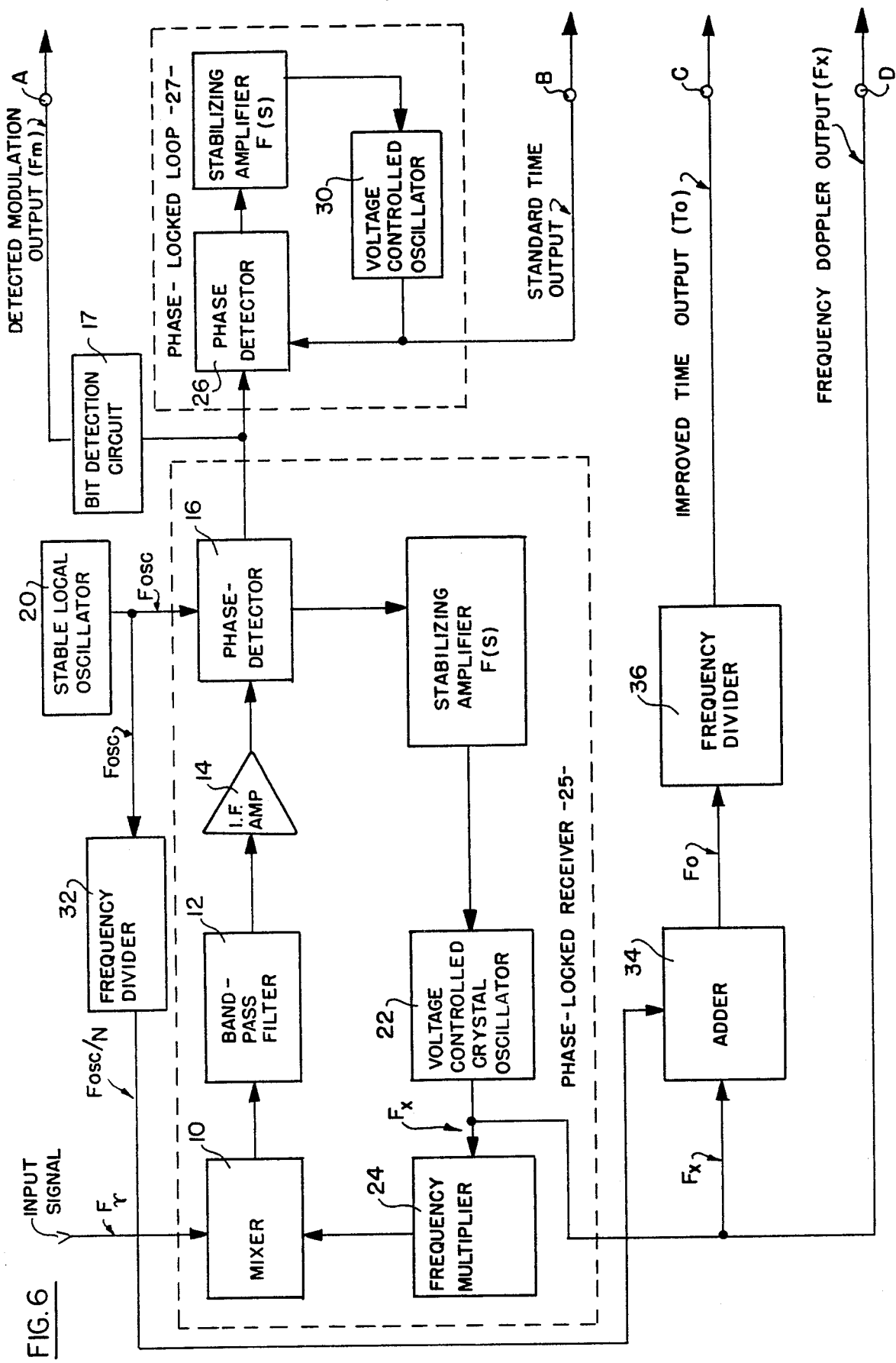

RECEIVER FOR SATELLITE NAVIGATIONAL POSITIONING SYSTEM

BACKGROUND

The receiver of the present invention is intended to respond to United States Navy Satellite Navigational Positioning System (NNSS) transmissions for precisely locating fixed or movable observation points on the surface of the earth. The NNSS system uses multiple orbiting Transit satellites which transmit orbit definition data at repeated time intervals. The basic NNSS system is described in U.S. Pat. Nos. 3,191,176 and 3,172,208.

As described in U.S. Pat. No. 3,172,208, typically, each Transit satellite's orbit is determined optically, or by other means of observation, and once the satellite's orbit is known with precision, the parameters describing the orbit are transmitted to the satellite for rebroadcast by the satellite. The observer at an unknown location receives the Doppler signals and orbital parameters from the satellite, and these data are supplied to a computer. The computer computes the satellite track from the orbital parameters, assumes various values for the earth's co-ordinates of the unknown location, and fits a theoretical Doppler signal curve to the actual Doppler signal curve. When the theoretical curve is fitted to the actual curve, the earth's co-ordinates of the observer's location will have been determined with a high degree of accuracy.

The Transit satellites in the NNSS system are in circular, polar orbits, about 1,075 kilometers high, circling the earth every 107 minutes. This constellation of orbits forms a "bird cage" within which the earth rotates, carrying the observer past each orbit in turn. Whenever a satellite rises above the horizon, the observer has the opportunity of obtaining a position fix. The average time interval between fixes with the existing five satellites which presently make up the NNSS system varies from about 35 to 100 minutes, depending upon latitude.

Each Transit satellite in the NNSS system includes a stable oscillator from which all signal frequencies are derived. A 150 MHz VHF carrier and a 400 MHz UHF carrier are derived from the oscillator. The carriers are phase modulated by digital signals representative of the orbit definition data, these data being transmitted during a repeated precisely timed two-minute time interval in the form of multi-bit words. The data are clocked at a selected clock frequency which is also derived from the stable oscillator. The clock generated by the satellite oscillator is adjustable from a ground station, to provide a precisely synthesized clock, which accurately defines each of the repeated two-minute time intervals during which the orbit definition digital data signals are transmitted.

The NNSS system includes tracking stations, and each time a Transit satellite passes within the line of sight of a tracking station, the tracking station receives the phase modulated 150 MHz VHF signal and the phase modulated 400 MHz UHF signal transmitted by the satellite. The tracking station measures the Doppler frequency shift caused by the satellite motion and records the Doppler frequency as a function of time, this frequency being the difference between the frequency of a stable local oscillator at the tracking station and the frequency of either one of the satellite carrier signals. The Doppler information is sent by the tracking station to a computing center where the data are used to determine each satellite's orbit, and to project each orbit many hours into the future. The computing center forms a navigational message from the predicted orbit, and this navigational message is sent to a plurality of injection ground stations. At the next opportunity, one of the injection ground stations transmits the navigation message to the appropriate satellite. Each satellite receives a new message about every 12 hours, although its memory capacity is 16 hours.

Unlike ground-based radio location systems which determine position by simultaneous measurements of signals from several fixed transmitters, NNSS measurements are made with respect to sequential positions of each Transit satellite as it passes the observer. This process typically requires from 6 to 16 minutes during which time the satellite travels from 2628 to 7008 kilometers providing an excellent base line. Because NNSS measurements are not instantaneous, motion of the observer's position during the satellite pass must also be considered in the calculations. Also, because the Transit satellites are in constant motion relative to the earth, simple charts with accurate lines of position are very difficult to generate. Instead, each satellite transmits a message which permits its position to be calculated to fractional meter accuracy as a function of time. By combining the calculated satellite position range difference measurements between these positions, that is Doppler counts, and information regarding the motion of the observer's position, an accurate fix of the observer's position can be obtained. Because the calculations are both complex and extensive, a small digital computer is required.

The NNSS system is one of the most dependable and reliable navigational positioning systems in existence at the present time, and it is considered the most accurate system for worldwide geodetic surveying. The available survey accuracy from the NNSS system is being constantly improved through more precise orbit predictions and through improved apparatus capabilities. Improvements have also been made in the software, and in the statistical message used to process the data by the observer's recovery system. However, no substantial advances have been made in recent years on the capabilities of the observer's receiver to recover the satellite transmissions with a high degree of accuracy.

A major source of error in the overall NNSS system is the inability of the receiver to extract accurately the satellite timing information. One reason for this is that present day prior art NNSS receivers extract the two-minute satellite timing information by recovering the synthesized clock from the demodulation products of the received satellite signals. However, such a technique produces timing errors due to frequency drifts of the local oscillator of the receiver, and also because of the high signal-to-noise ratio in the demodulation products from the demodulated signals which are at an extremely low amplitude level.

More specifically, in the prior art NNSS receivers, one of the satellite radio frequency carriers is demodulated and the synthesized satellite clock is recovered to enable the receiver to extract precise time information identifying the two-minute timing interval of the received data. However, in order to recover the satellite's synthesized clock, the prior art receiver depends on a local clock oscillator to effectuate the demodulation process, and with a phase-locked loop circuit recover the synthesized clock from the demodulation products.

Prior art receivers are inaccurate since they depend upon the local clock oscillator and do not recover the true time slope and corrections programmed into the satellite clock by the injection station.

The NNSS satellite receiver of the present invention, on the other hand, derives the actual satellite clock directly from one of the radio frequency carriers, rather than deriving the synthesized clock from the demodulation products of the carrier, and its recovery process is not dependent upon a local clock. Through the technique of the present invention, the effects of long term drift of the local receiver oscillator, and detector signal-to-noise ratio errors, and other sources of error in the extraction of the two-minute time interval information from the received satellite signals are eliminated. Any drift in the oscillator of the satellite is recorded by the United States Naval Observatory, and is contained in the transmitted satellite signals. This enables the receiver to make appropriate corrections for drifts in the satellite clocks.

The principal objective of the present invention, therefore, is to provide a receiver for use in the NNSS system which achieves more accurate time interval information recovery from the received satellite signals, as compared with the prior art receivers, so as to achieve highly accurate geodetic positioning and surveying capabilities in the system.

As explained above, the operation of the receiver of the invention is predicated on the principle which invokes the extraction of both time and Doppler frequency signals from the received radio carrier, rather than deriving the time signals by the use of a local clock and detected modulation of the radio frequency carrier. The receiver of the invention eliminates to all intents and purposes the effects of time interval measuring errors for positioning accuracies of the system in the centimeter range. The receiver of the invention is capable of recovering precise timing information from the transit satellites to the extent that significant errors due to the satellite correction operations and off-sets are corrected in the receiver.

BRIEF DESCRIPTION OF THE DRAWINGS

FIG. 1 is a table designating the format of the digital data which are transmitted from each Transit satellite in the NNSS system;

FIG. 2 represents a timing ramp which is generated in the satellite, and on which time variations in microseconds are plotted against time in seconds;

FIG. 6 is a block diagram of a receiver for use in the NNSS system, which incorporates the concepts of the invention.

DETAILED DESCRIPTION OF THE ILLUSTRATED EMBODIMENT

The table of FIG. 1 illustrates the format of the digital data which are transmitted from each Transit satellite as binary coded words which are phase modulated on the VHF and UHF carriers. The left side of the table is a column of twenty-six lines, and the table represents a total of 6,103 bits of data for a period of time of precisely two minutes. The bits make up 156 words which are coded by employing 39 bits per word. Each word contains one bit which is available for time correction, except for those bits shown in the shaded rectangles. Three major areas exist in the table, and these comprise the Variable data; the Fixed data; and the Injection period of lines 23 through 25. The Variable data are contained in the sixth word of the eight 6-word lines. The last line contains the words 153, 154, 155, 156, 1 and 2, and it also contains 19 extra bits. The two-minute timing mark follows words 1 and 2, and these words are followed by a "beeper" word which is shown at the top left-hand corner of the table. The beeper word is simply an audio tone for observer monitoring. Group A contains classified information, whereas Group B is the broadcast data which are recovered by the receiver at each observer position.

As mentioned above, the clock signal in each Transit satellite is remotely adjustable by ground stations to provide very precise two-minute marks. The NNSS system is designed for satellite clock correction by ground injection signals so as to correct for the clock drift rate of the individual satellites. This correction is made to the clock signal itself, and no correction is made to the actual oscillator.

A typical satellite-generated timing ramp on which the time variations in microseconds are plotted against the time in seconds is shown in FIG. 2. The abscissa of the timing ramp is the two-minute interval, and the total ramp variation shown by the ordinate is 90 microseconds. A maximum of 123 clock correction bits are available. Each bit, when set, extends that bit by 9.6 microseconds. An average group of 55 time extension bits is used by the injection station to correct the satellite time clock. The frequency of the precision oscillator in the satellite, as noted, is not changed by the ground injection signals.

The three major data groups of the table of FIG. 1 are shown on the ramp in FIG. 2, namely the Variable data group, the Fixed data group, and the Injection group. The clock in the case shown in FIG. 2 is running fast, and correction bits are added during the Variable data and Fixed data periods incrementy to slow the clock. The area reserved for the injection period is shown at the start of the 135th word, or 101.222 seconds past the timing mark. This area is not used for any of the clock correction bits, and the oscillator clock drift rate produces the steep final uncorrected ramp down to the 120th point. The over-compensation is deliberate to allow for injection.

Figure 3:
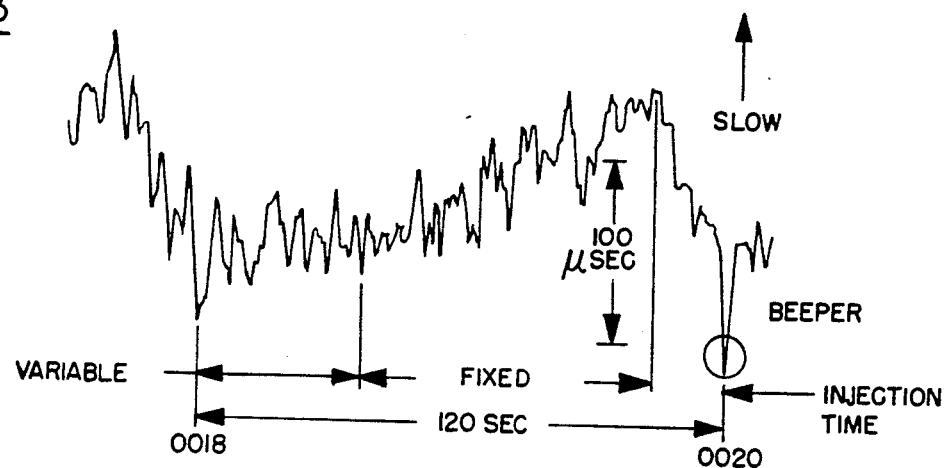
FIG. 3 illustrates the actual recovery data recorded from a particular satellite in the NNSS system.

The actual time recovery data for a particular satellite on a particular day is shown in FIG. 3. The Variable data in this case do not contain any clock correction bits. However, the Fixed data period does show that about twelve extra bits are used to slow the clock. The chart of FIG. 3 was obtained by comparing satellite modulation and timing information against a fractional microsecond time interval signal specifically developed for that purpose.

It is obvious from the chart of FIG. 3 that time recovery is a very faithful reproduction of the transmitted data. Reference to FIG. 3 gives a perspective of the 100 microseconds clock timing ramp offset during the 120 second period. It should be realized that the 100 microseconds in error in Doppler timing represent 63 centimeters of position error, based on satellite velocity which is 6.3 kilometers per second ground track for an overhead pass.

Figure 4:
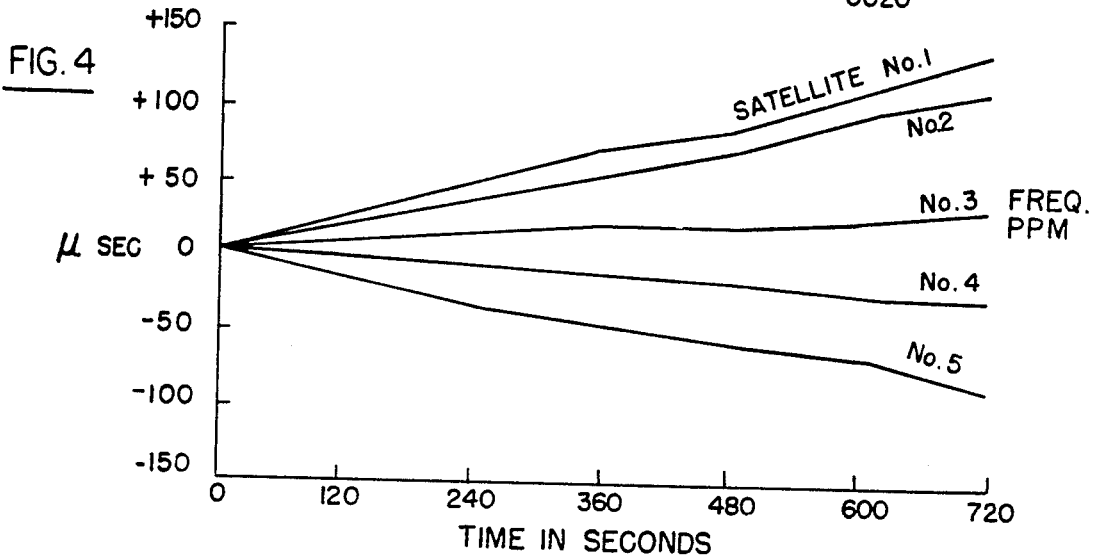
FIG. 4 is a series of curves representing recorded date from different satellites and indicating the oscillator drift rate of the individual satellites.

FIG. 4 shows satellite oscillator drift rates over a 600 or 700 second portion of a typical pass of the individual transit satellites, as determined by the receiver of the invention. These drift rates are uncorrected in the receiver of the invention. To compensate for differences in the actual satellite clock, as recovered by the receiver of the invention from the satellite carrier, the synthesized satellite clock is corrected by the ground station.

Figure 5:
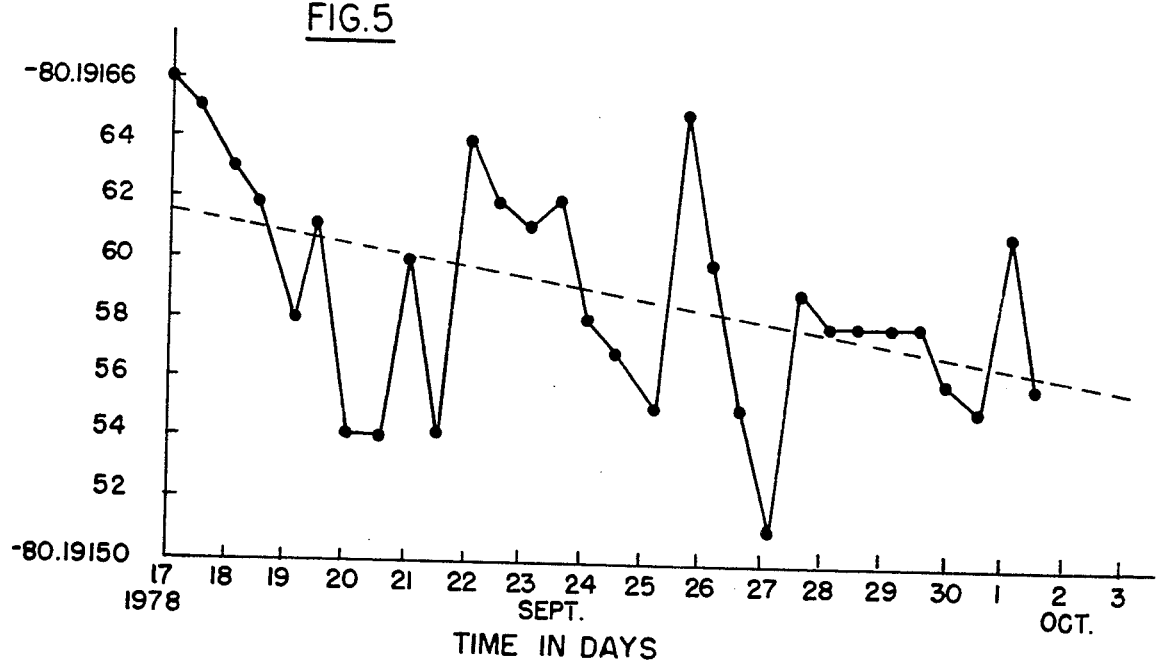
FIG. 5 is a curve showing the actual frequency of a particular satellite reported by the United States Naval Observatory.

The actual clock of one satellite reported by the United States Naval Observatory in parts per million plotted against time in days is shown in FIG. 5. This particular satellite demonstrates an off-set of $-80.191,66$ PPM (parts per million) and during the first day, only 0.000,03 PPM of drift was recorded. At the farthest point (Sept. 27th) the deviation is only 0.000,14 PPM, or only 0.13 microseconds error during a 960th average satellite pass. The receiver of the invention obtains the information shown in FIG. 5 from the satellite signals. To adjust the clock, the satellite carrier is used by the receiver in conjunction with appropriate software for accurate recovery of the time information for the two-minute interval or a portion thereof.

A block diagram of an NNSS receiver which incorporates the concept of the present invention is shown in FIG. 6. The receiver includes a heterodyne mixer 10, which receives one of the phase-modulated UHF or VHF carriers ($F_r$) from the satellite, after the carrier has undergone appropriate radio frequency amplification. The mixer 10 is connected through a band pass filter 12 to an intermediate frequency amplifier 14. The output of the intermediate frequency amplifier 14 is introduced to a phase detector 16. An ultra stable local oscillator 20 is connected to the phase detector 16. The output of phase detector 16 is introduced to a stabilizing amplifier stage $F_{(s)}$, the output of which is introduced to a voltage controlled crystal oscillator 22. The voltage controlled oscillator 22 is connected to a frequency multiplier 24 which, in turn is connected to the heterodyne mixer 10.

The components described above form a usual prior art phase-locked receiver. The circuitry of the individual components, and of the other components to be described herein, is well known to the art. It is believed unnecessary to include a detailed description of such circuitry in the present specification.

The output of phase detector 16 is also introduced to a bit detection circuit 17, and the detected modulation output $F_{(m)}$ as obtained from the bit detection circuit appears at an output terminal A. The output $F_{(m)}$ represents the recovered data, and is introduced to a computer or microprocessor for processing. In accordance with the prior art practice, the output $F_{(m)}$ is introduced to a phase detector 26 in a phase-locked loop 27. The phase detector is connected through a stabilizing amplifier $F_{(s)}$ to a voltage controlled oscillator 30 which, in turn, is connected back to the phase detector 26. The phase detector recovers the synthesized time clock from the detected modulation products of the received carrier. This clock signal is applied to output terminal B, and constitutes the time output of the receiver.

In accordance with the present invention, the ultra stable local oscillator 20 introduces its output signal ($F_{osc}$) to a frequency divider 32, which divides the signal by N and which introduces the divided signal to an adder 34. The output ($F_x$) of the voltage controlled crystal oscillator 22 is also introduced to the adder, and the output ($F_o$) from the adder is applied to a frequency divider 36 in which it is divided by K. The improved time output ($T_o$) of the receiver of the invention is obtained at the output of the divider 36 and is applied to an output terminal C. The Doppler output ($F_x$) is obtained from the voltage controlled oscillator 22 in accordance with the prior art practice which is locked to the frequency of the received satellite signal and the multiplied frequency of the local oscillator, and this frequency is applied to an output terminal D. The Doppler frequency output ($F_x$) is the difference between the frequency of the detected synthesized satellite clock and the frequency of the local oscillator. The following formulas are applicable to the operation of the receiver of FIG. 6.

$$F_r = F_t + \Delta F_s + P_E \tag{1}$$

$$F_x = \frac{F_r - (F_{osc} + \Delta F_{osc})}{N} = \frac{F_t + \Delta F_s + P_E - (F_{osc} + \Delta F_{osc})}{N} \tag{2}$$

$$F_o = F_x + \frac{F_{osc} + \Delta F_{osc}}{N} = \frac{F_t + \Delta F_s + P_E}{N} = \frac{F_r}{N} \tag{3}$$

$$T_o = \frac{F_o}{K} = \frac{F_r}{(N)(K)} = \frac{F_t + \Delta F_s + P_E}{(N)(K)} \tag{4}$$

Where:
$F_m$ = detected modulation output
$F_t$ = satellite transmitted frequency
$F_r$ = received carrier frequency
$F_{osc}$ = local oscillator output
$F_x$ = voltage controlled oscillator output
$T_o$ = time output
$P_E$ = total ray path error with Doppler
$\Delta F_s$ = satellite oscillator offset
$\Delta F_{osc}$ = local oscillator offset The time interval output is $F_o$ divided by any constant whole or fractional number to obtain any desired output ($T_o$). A basic consideration of the approach is that all the variations ($\Delta V_{osc}$) in the local oscillator 20 are cancelled as shown in equation (3). The second basic important factor is that errors from the satellite oscillator ($\Delta F_s$) and the total ray path ($P_E$) error are divided by a known factor (N) which is a selectable parameter and is predictable. A further important consideration is that in equation (4) the errors $\Delta F_s$ and $P_E$ are divided by the (N) (K) term which is very large. In transit satellite applications this term is typically on the order of $1.8 \times 10^9$.

The blocks 32, 34 and 36 which provide the improved time output signal ($T_o$) in accordance with the present invention derive their input from the phase-locked receiver 25 made up of the blocks 10, 12, 14, 16, 22 and 24. The voltage controlled crystal oscillator 22 is phase-locked to the input frequency ($F_r$). The output ($F_x$) from oscillator 22 is converted and divided down to the desired timing signal by blocks 34 and 36.

In the prior art receiver, the phase-locked loop 27 of elements 26 and 30 was used to demodulate the input signal, and the output from its voltage controlled oscillator 30 was used directly for timing. Inaccuracies resulted from the use of modulation in the prior art receivers, instead of using the carrier frequency, as is the case with the receiver of the present invention, for four main reasons: (a) typically, only about 6% of the total radio frequency energy is contained in the modulation, and less energy results in noisy timing data; (b) the carrier frequency ($F_r$) is typically four million times higher than the modulation frequency ($F_m$), so that phase errors inherent in any circuit are divided by this large ratio and result in considerable improvement in timing; (c) the time bit corrections which cause the timing ramp between satellite-transmitted 2-minute marks have no effect on the timing accuracy of Doppler intervals within the satellite-generated 2-minute period; and (d) timing jitter position errors are introduced into most position measuring systems because the receiver bandwidth time delay is not constant especially when the bandwidth occupied by the composite data signal is not centrally located and/or symmetrically located in the receiver bandpass circuits. The receiver selectivity response curve, especially the most narrow bandwidth, is the most critical. Since the NNSS signals are modulated with data and Doppler frequency components as a function of time, a conflict of requirements exists. One design criterion for best accuracy is to track the composite signal in a very narrow (more noise-free) bandwidth and the other is to pass the composite signal with a constant time delay which dictates the use of a wide bandwidth. The circuit described here allows the best known design balance to provide a means for improved positional accuracy measurements.

In the operation of the receiver of FIG. 6, the input signal ($F_r$) is heterodyned down to an intermediate frequency in the mixer 10, and is amplified by intermediate frequency amplifier 14, and phase-locked to a fixed oscillator input. These components represent the conventional phase-locked receiver 25. The resulting output ($F_x$) from the voltage controlled crystal oscillator 22 is the same as the input signal frequency minus the intermediate frequency divided by the ratio of the frequency multiplier 24.

To convert the output ($F_x$) from the oscillator 22 to a usual time source, it is first necessary to add back the intermediate frequency ($F_{osc/N}$) to obtain a new signal which is exactly the input signal ($F_x$) divided by the ratio "N". This operation is performed in adder 34 and divider 32, and the new signal ($F_o$) is derived from the adder. The new signal $F_o$ can now be divided by any fixed number (whole or fractional) in frequency divider 36 to obtain the desired improved time output signal ($T_o$).

Improved accuracy in the receiver of the invention results, inter alia, because the converted frequency from the voltage controlled crystal oscillator 22 divided down by "N" (frequency divider 32) and "K" (frequency divider 36) to obtain the time output ($T_o$) so that any inherent errors in the recovery of the signal are also divided down. Because of this division, a standard time element may be subdivided for fine resolution measurement. Time accuracy improvements of 100 to 1 are typical over the prior art receivers in the NNSS system.

The invention provides, therefore, an improved NNSS system receiver which is capable of extracting time interval information from the received satellite signals with substantially greater accuracy than the prior art receivers of the same general type.

It will be appreciated that although a particular embodiment of the invention has been shown and described, modifications may be made. It is intended in the claims to cover the modifications which come within the spirit and scope of the invention.

What is claimed is:

1. A receiver for use in a satellite system, said system comprising a plurality of satellites each of which includes means for producing a radio frequency carrier and a clock having a frequency related to the frequency of the carrier, said carrier being phase-modulated with digital data, and said clock being adjustable in response to injection signals from a ground station to provide a precise repeatable time interval during which the digital data is transmitted, said receiver including: a receiver system phase-locked with the radio frequency carrier from the satellite and including a heterodyne mixer for receiving the radio frequency carrier, means connected to said heterodyne mixer and including a phase detector for recovering the digital data from the carrier, a stable local oscillator for supplying a reference signal to said phase detector, first circuit means including a voltage controlled oscillator connected to the phase detector and responsive to a phase error signal from the phase detector for supplying a heterodyne signal to the mixer having a predetermined frequency relationship with the carrier, and second circuit means connected to said stable local oscillator and to said first circuit means for producing an output timing signal having a frequency which is a predetermined sub-multiple of the frequency of said carrier.

2. The receiver defined in claim 1, in which said first circuit means includes a frequency multiplier interposed between the output of the voltage controlled oscillator, and the heterodyne mixer for multiplying the frequency of the output of the voltage controlled oscillator by a predetermined multiplier N.

3. The receiver defined in claim 2, in which said second circuit means includes an adder circuit connected to the output of the voltage controlled oscillator, and a frequency divider circuit connected to the output of the stable local oscillator and to the adder for supplying a signal to the adder whose frequency is 1/N of the frequency of the local oscillator.

4. The receiver defined in claim 3, in which said second circuit means includes a divider circuit connected to the output of the adder to divide the frequency of the output signal from the adder by a divisor K.

5. The receiver defined in claim 4, and which includes means for deriving a Doppler frequency output from the output of the voltage controlled oscillator.

6. The receiver defined in claim 4, and which includes a phase-locked loop connected to the phase detector and responsive to the detected output thereof, for recovering the satellite clock signal.

7. A receiver for use in a satellite system which comprises a plurality of satellites each including means for producing a radio frequency carrier and a clock having a frequency related to the frequency of the carrier, said carrier being phase modulated with digital data, and said clock being adjustable in response to injection of signals from a ground station to provide a precise repeatable time interval during which the digital data is transmitted, said receiver including: circuitry for receiving the radio frequency carrier, phase detector means coupled to said circuitry for recovering the digital data which is phase modulated on the carrier; and further circuitry connected to said first-named circuitry and responsive to the radio frequency carrier received thereby for producing a timing signal having a predetermined frequency relationship with said carrier.

8. The receiver defined in claim 7, in which said first-named circuitry includes a local oscillator, and in which said further circuitry includes circuit means for rendering the frequency of the timing signal produced thereby independent of frequency drifts of said local oscillator.

* * * * *